Oct. 15, 1968   M. J. P. BOGART   3,405,561
FLIGHT SIMULATOR

Filed Sept. 29, 1964   2 Sheets-Sheet 1

INVENTOR.
MARCEL J. P. BOGART
BY
Flynn Marn & Jangarathis
ATTORNEYS

Oct. 15, 1968    M. J. P. BOGART    3,405,561
FLIGHT SIMULATOR

Filed Sept. 29, 1964    2 Sheets-Sheet 2

INVENTOR.
MARCEL J. P. BOGART
BY
Flynn Marr & Jangarathis
ATTORNEYS

United States Patent Office 3,405,561
Patented Oct. 15, 1968

3,405,561
FLIGHT SIMULATOR
Marcel J. P. Bogart, London, England, assignor to The Lummus Company, New York, N.Y., a corporation of Delaware
Filed Sept. 29, 1964, Ser. No. 400,007
9 Claims. (Cl. 73—432)

ABSTRACT OF THE DISCLOSURE

The present invention relates to a testing facility for studying the effects of direct and reflected solar radiation on a satellite orbiting the earth. More specifically, this disclosure is directed to a testing facility having solar radiation and earth-shine simulator sources mounted outside a refrigerated testing chamber. The testing chamber has windows therethrough for receiving rays from the simulator sources, a satellite model rotatably mounted therein, and a system of mirrors mounted therein for directing the simulated solar and earth-shine rays at the satellite model.

---

The present invention relates to outer space simulators, and more specifically to a testing facility for studying the effects of direct and reflected solar radiation on a satellite orbiting the earth.

The designing and production of satellites and other objects to be launched into outer space include a study of models of the object in an environment duplicating as nearly as possible or desirable, that which the object is likely to encounter in space. Solar radiation is one of the important factors contributing to the environment of outer space, and its effect on an object orbiting the earth must be studied by experiments and tests in readily accessible apparatus.

A satellite (or other object) orbiting the earth receives mainly direct solar radiation, and solar rays reflected from the earth; minor radiation received from other sources in space is not significant in heat balance studies. The solar rays reflected from the earth will hereinafter be referred to as earth-shine. Since the satellite may rotate in a regular or irregular manner about one or more of its axes as it revolves around the earth, and the earth rotates about its axis as it revolves around the sun, the direction and intensity of the direct solar radiation and earth-shine beamed at the satellite vary in a random or regular, predictable, and continuous manner with respect to one another. Unless the satellite is hidden from the sun by the earth, it will receive direct solar radiation and/or earth-shine which cover at least a portion of its surface; the size of the portion depending upon the relative positions of the sun, earth, and satellite. In simulating all significant radiations seen by a satellite orbiting the earth, the major problem is duplicating radiation beamed from two sources, whose directions vary in a regular, predictable manner with respect to each other, onto an object which may be rotating in space in either a random manner, i.e., uncontrolled yaw, pitch, and roll; or in a programmed manner, i.e., a communication satellite whose antennae must always point earthward.

While various testing facilities have been designed to duplicate the environment of outer space, none have economically and sufficiently simulated the radiations received by an object orbiting the earth. Known testing facilities include a testing chamber having a radiation lamp mounted therein for beaming simulated solar rays at the object to be tested. Because of the fact that the radiation lamp is a single source, it is incapable of simulating the radiation characteristics of outer space where radiation is beamed at an object orbiting the earth from two sources, i.e., the sun and the earth. Obviously such a lamp cannot beam rays at the object under test which will cover more than one-half of the objects surface; nor can a single lamp beam two sets of rays whose directions vary continuously.

A further disadvantage of known testing facilities is that the lamps mounted in the testing chambers dissipate large amounts of heat which burden the refrigeration systems of the chambers, and which must be removed by liquid nitrogen or colder refrigerant, and thus at a large expense if the cold heat sink of outer space is also simulated.

Accordingly, one of the main objects of this invention is the provision of an improved testing facility for studying the effects of radiation on an object orbiting the earth, which successfully overcomes the disadvantages associated with known testing facilities.

It is another object of this invention to provide a testing facility capable of accurately simulating, under conditions of high vacuum, solar radiation beaming directly from the sun, and solar rays reflected by the earth, onto a satellite orbiting the earth.

It is still another object of this invention to provide a testing system having direct solar radiation and earth-shine simulator sources capable of shining on a satellite model under study in the same manner that direct solar rays and earth-shine shine on an object actually orbiting the earth.

It is a further object of this invention to provide an outer space simulating facility capable of beaming radiation over substantially the entire surface of an object under test.

It is a still further object of this invention to provide a testing facility for simulating the environment of outer space, including the high vacuum of space, whose simulated radiation sources will not burden the refrigeration system of the facility.

A still further object of this invention is the provision of a testing facility having a testing chamber of minimum volume.

Yet another object of the present invention is to provide a testing chamber wherein a satellite model will see only cold back space (100 degrees K.) and impinging solar and earth-shine radiation.

Another object of this invention is to provide a testing chamber for simulating the environment of outer space which has minimum refrigeration requirements.

Still another object of the present invention is the provision of a reliable outer space simulating facility which is compact, mechanically uncomplicated, and simple, practical, and relatively inexpensive to construct and operate.

The aforementioned objects are attained by providing a testing facility having solar radiation and earth-shine simulator lamps mounted outside a refrigerated testing chamber. The testing chamber has windows therethrough for receiving rays from the simulator lamps, a satellite model rotatably mounted therein, and a system of mirrors mounted therein for directing the simulated solar and earth-shine rays at the satellite model.

Other objects and advantages of the invention will hereinafter become more fully apparent from the following description, which, taken in connection with the drawings, illustrates a preferred embodiment thereof.

Prior to considering the drawings in detail, it is believed that understanding of the invention will be facilitated by a preliminary discussion of simulation technique and the substantial problems associated therewith, and the solutions to those problems embodied in the present invention.

The unusual conditions experienced by a satellite orbiting the earth or the moon are mainly fourfold:

(1) Weightlessness, or reduced gravity. This is difficult to simulate properly, and is best done by mechanical devices (springs, counterweights, etc.). Its simulation is not considered a part of the present invention.

(2) Near-absence of atmosphere. The high vacuum ($10^{-13}$ mm. Hg or less) of outer space is simulated by conducting the tests in an evacuated chamber. Generally, there is no advantage gained in going to a vacuum lower than $10^{-8}$ mm. Hg, as the adverse or peculiar phenomena associated with low pressure (desorption of gas molecules on surfaces, absence of convective current, evaporation of lubricants and placticizers, etc.) have already made their appearance.

(3) More intense radiation from the sun and from earth-shine due to the absence of cloud layers.

(4) Low temperature of outer space.

It is most important that temperatures be closely controlled in artificial satellities. The sources of thermal energy which affect temperatures of satellites orbiting in space include internal generation (from the functioning of its component parts) and absorption of incident radiation or emission (or both) from the sun and other celestial bodies. The maintenance of a proper heat balance is vital to the proper functioning of the delicate and exotic instruments carried by these satellites, and to life itself in the case of manned vehicles. Temperatures are controlled by two fundamental methods—actively by thermostats controlling louvers, refrigeration system, etc., and passively by employing combinations of high-space and low emissivity coatings to control satellite surface and/or interior temperatures.

It has been found that materials exhibit unusual behavior in the combination of high vacuum and the intense radiation of space that are not found in the case of high vacuum alone or with radiation in an atmosphere of air (oxygen) and moisture. This is particularly true in the case of coatings used in satellites. In the normal terrestrial atmosphere the photochemical reactions result in the degradation of thin-film organic polymers by rupture of molecular bonds. In high vacua there may be cross-linking and further polymerization, leading to discoloration, shrinkage, embrittlement, and loss of adhesion, and marked increase in absorption of ultraviolet energy. The combination of intense radiation and high vacuum also results in volatilization of polymers or of other materials used in compounding these coatings.

In view of this, and the enormous expense of developing the many highly-specialized artificial satellites with the highly complicated scientific instruments they contain, and of their launching and placing in orbit by rocketry, it is required that they be brought to as high a stage of perfection and reliability as is possible on the ground. This is done by testing in as close a duplication as is feasible of the strange environment and unusual conditions encountered in flight in a test chamber, known as a simulator. There are already many kinds of simulators designed and operating, depending upon the type of testing to be done and test objects and/or personnel functions to be studied.

Due to the high vacuum (obviating convection) and the isolation (no conducting means) of the orbiting satellite, the only mechanism left for heat transfer is radiation. The satellite in orbit will "see" the cold, black celestial vault (4° K.), the sun, the earth and other heavenly bodies. It will thus receive heat mainly by radiation from the sun and re-radiation from the earth, all other external heat sources being negligible. It will, in turn, lose heat by radiation to the 4° K. sink of outer space. It is the efficient and economical simulation of this heat transfer system in a test facility that forms the basis of the present invention.

In practice, the 4° K. sink is usually adequately imitated by providing a black, nitrogen-cooled (100° K.) "shroud" lining the chamber so that any location on the satellite test object "sees" only the refrigerated or cryogenic shroud and/or the radiation sources. If the test object is at 300° K., the error in using the 100° K. heat sink is the difference between ($300^4 - 100^4$) and ($300^4 - 4^4$), which is only one part in 81. It is, of course, much cheaper to remove the heat at 100° K. with liquid nitrogen than at 4° K. with helium. It is possible, however, to add some panels cooled to, say, 12° K. with helium, for "cryopumping" to help maintain the high vacuum in the chamber by the mechanism of condensing out residual gas molecules and immobilize them by freezing on the 12° K. surfaces. In this case, the nitrogen-cooled shroud also helps to shield the 12° K. panels from heating up by the heat-radiating sources present in the simulator.

The simulator is thus a vacuum-tight chamber whose envelope is penetrated only for access hatches, radiation inlet and observation windows, and vacuum pump nozzles, and which is sized to accommodate the test object, test equipment, and operating auxiliaries, lined by the black nitrogen-cooled shroud and cryogenic pumping panels (if desired), and connected to conventional diffusion pumps and their auxiliaries. External to the chamber are two radiation sources (solar and earth-shine), the back-up system for the vacuum pumps, and the refrigeration system to provide cold liquid nitrogen to the shroud elements and cold helium to the cryopanels (if provided). Penetration of the chamber and shroud are kept to a minimum size and number for structural reasons and to minimize hot surfaces "seen" by the test object.

Since the sun is the major source of radiation, its large simulated source is fixed relative to the simulator chamber in the supporting structure or building. It is then necessary that the radiation from the second source (earth-shine) be able to vary continuously in a 180° arc, ranging from the same direction as the radiation from the "sun" to that exactly opposite. In practice this traverse does not start at exactly zero divergence angle, but in the present design it will effectively begin where two mirrors no longer overlap.

The major problem is to have both radiation sources outside of the chamber to enable the use of normal air cooling and to avoid having the large amount of heat generated by these sources removed by liquid nitrogen at 100° K. Having already fixed the solar simulator source with respect to the chamber and external to it, the optics are worked out to give the desired beam spectral energy distribution (by carbon arcs or Xenon lamps, for example) and desired degree of collimation, and to give a beam width trimmed down to fit a reasonably sized entry window penetrating the chamber wall and shroud, which may be made of material such as fused silica.

One of the novel features of this invention is the manner in which radiation from a second external source is played on the test object, varying in direction from one of 180° from that of the solar source to one nearly coinciding with it. By mounting the test object itself in a remotely-controlled double gimbal mount, all positions of an orbiting object with respect to the simulated sun and the earth can be obtained. Proper control and programming of the second source direction and test object orientation allows the imitation of any random or regular motion of an orbiting satellite in space.

One advantage of the present invention is that the mechanism is hung from the top dome where the local temperature is higher than that in the nitrogen-cooled portion of the chamber, relieving the bearings of having to work at such low temperatures. It is also required to simply rotate under programmed conditions about its primary axis, with no need for any motion of the three mirrors with respect to each other.

Reference is now made to the accompanying drawings illustrating an embodiment of the invention, and in which.

Figure 1:
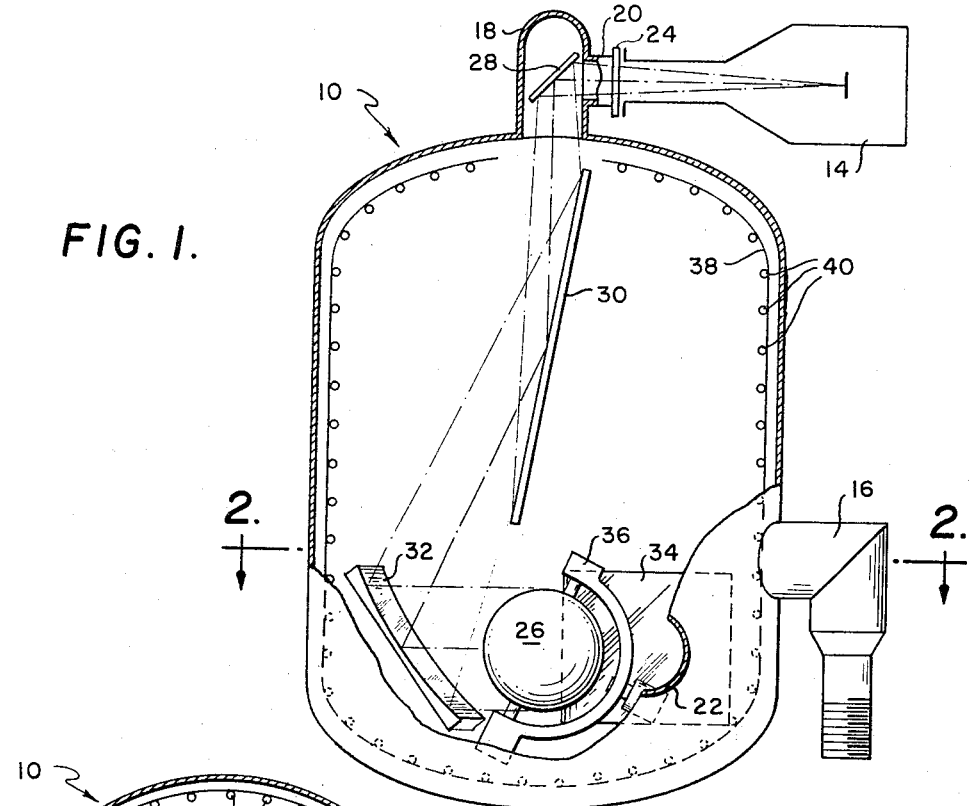
FIGURE 1 is a plan view, partly in section, of a preferred embodiment of the testing facility of this invention.
Figure 2:
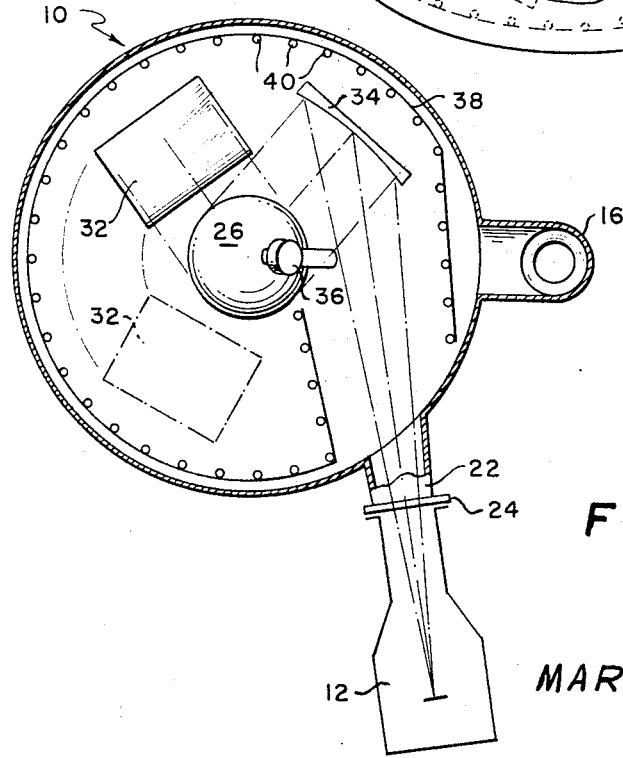
FIGURE 2 is a section view of the facility taken substantially along line 2—2 of FIG. 1.
Figure 3:
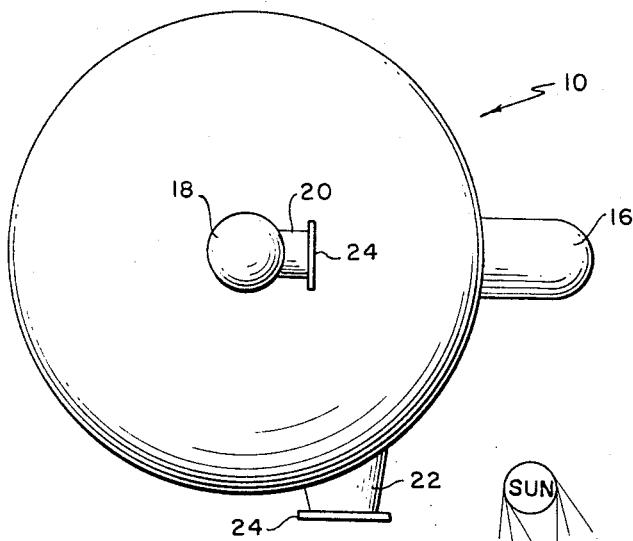
FIGURE 3 is a top plan view of the testing chamber.

Referring now to the drawings, wherein like reference characters designate like or corresponding elements throughout the several views, there is seen in FIGS. 1–3 the testing facility of this invention. The facility includes a testing chamber 10, solar simulator lamps 12, and lamps 14 for simulating the solar rays which are reflected from the earth, hereinafter referred to as an earth-shrine simulator lamp. One or more elbows 16 extend outwardly from the chamber 10 and connect the interior of the chamber to a diffusion pump (not shown) and conventional auxiliary vacuum equipment (cold baffle, oil trap, etc.). Projecting upwardly from the center of the upper surface of chamber 10 is a dome portion 18 for housing a reflecting element and suspension and rotation mechanism for the earth-shine simulator mirrors, more fully described hereinafter. An earth-shine receiving port 20 is located in the dome portion of the chamber 10 for receiving simulated earth-shine rays beamed from the earth-shine simulator lamp 14; and a solar radiation receiving port 22 is situated in the lower portion of the chamber 10 for admitting simulated solar rays beamed from the solar simulator lamp 12. Quartz windows 24 are seated in the ports 20 and 22.

It will be understood that lamps 12 and 14 comprise suitable lamps or carbon arcs, together with appropriate auxiliary equipment including igniter circuits, condensers, optical masks and filters, cooling and ventilation equipment, switch-gear, and the like, all of which is known to the art.

Disposed within chamber 10 is the object to be studied, shown herein as a satellite model 26. A system of mirrors comprising an earth-shine receiving mirror 28, an earth-shine transfer or folding mirror 30, and earth-shine collimating mirror 32, and a solar radiation collimating mirror 34 are also mounted within chamber 10. The solar radiation collimating mirror 34 is mounted opposite the port 22 for receiving simulated solar rays from the lamp 12 and deflecting them toward the satellite model 26.

The earth-shine receiving mirror 28 is mounted adjacent the earth-shine receiving port 20 in the nose portion 18 of the chamber 10, and is tilted to deflect the earth-shine rays from the earth-shine simulator lamp 14 downwardly. The transfer or folding mirror 30 is tilted to receive rays from the earth-shine receiving mirror and deflect them to the earth-shine collimating mirror 32, which, in turn, is tilted to direct the rays toward the satellite model 26.

Considering the satellite as a homogeneous sphere, it may be appreciated that the simulated earth-shine beam need only traverse thru an arc of nearly 180 degrees (starting from nearly the same direction as the simulated solar beam) in order that the entire surface of the satellite model 26 be radiated, accurately reproducing all radiation "seen" or experienced by a high altitude satellite. To reproduce the radiation "seen" or experienced by a low altitude satellite (100 to 200 miles from the earth's surface), the simulated earth-shine beam need only traversely slightly over 90 degrees of arc. Traversal of the desired arc by the simulated earth-shine beam is accomplished by mounting the earth-shine transfer mirror 30 and the earth-shine collimating mirror 32 on a single, rigid, remotely-controlled frame which is free to rotate approximately 180 degrees about the longitudinal axis of the chamber. Thus, the earth-shine collimating mirror 32 may be moved from the solid to the dotted line positions of FIG. 2. The only requirement for the remotely controlled frame is that it not interrupt either beam. A suitably counterbalanced cage-like structure will be obvious to one skilled in the art; for purposes of simplicity and ease of understanding this structure is only partially represented schematically by the dotted lines between the solid-lined mirror 32 and the dotted-lined mirror 32 in FIG. 2.

The satellite model 26 is mounted in a remotely-controlled double gimbal mounting 36 which controls the orientation of the model. By virtue of this mounting, all possible attitudes and movements of the satellite in space, including yaw, pitch, and roll, may be reproduced. If desired, the control of the rotation of the satellite model in the gimbal mount may be computer programmed. A cryogenic shield 38, shown herein as a black, cold shroud which may be equipped with a number of nitrogen refrigerant circulation tubes 40, surrounds the mirrors and satellite model to maintain the interior of the chamber dark, and at the low temperature conditions of outer space with minimum refrigeration requirements.

With the exception of the black, cold shroud elements, all of the elements in the testing chamber are preferably fabricated of highly polished aluminum or stainless steel to provide maximum reflectivity. External supports are preferably fabricated of carbon steel, each support being suitably designed for supporting its static load and for maintaining proper alignment of all important elements of the facility, such as the testing chamber and simulator lamps, with respect to each other.

Figure 4:
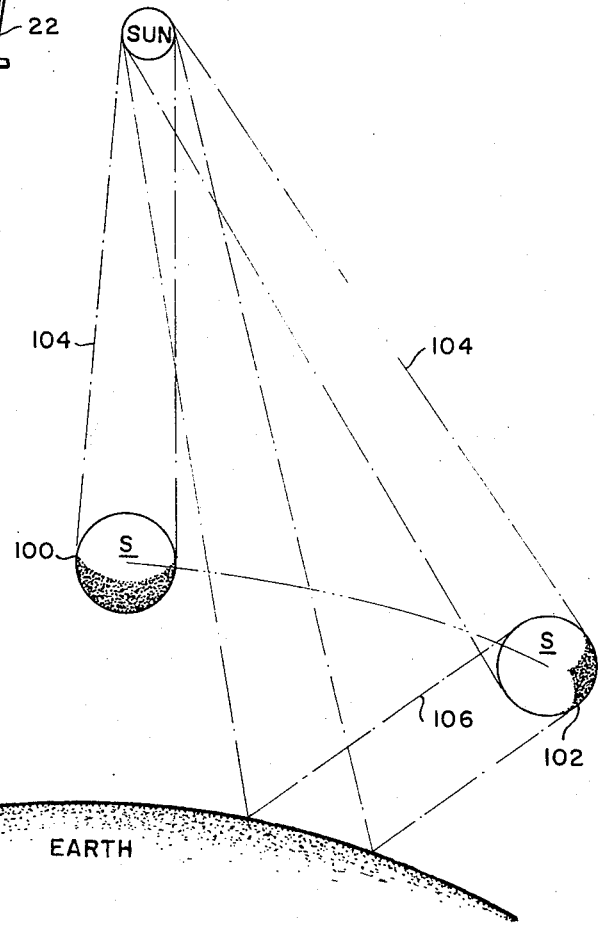
FIGURE 4 depicts an actual orbiting satellite in two different positions relative to the sun and earth.

Before proceeding to a description of the testing facility in operation, reference should be made to FIG. 4 for an illustration of the manner in which a satellite orbiting the earth receives direct solar radiation and earth-shine. A satellite orbiting the earth may receive solar rays from the sun only, or from the sun and earth, or may receive no solar radiation at all, depending upon its position relative to the sun and earth. Satellite S, when in position 100, directly between the sun and earth, so that the centers of the sun, satellite and earth lie in a straight line, will receive rays 104 from the sun. The satellite will also receive some reflected rays from the earth, due to the actual relative sizes of the sun, earth and the satellite, which could only be shown by making the drawing to approximate scale. When the satellite S is in position 102, located between the sun and earth, but not directly between, it will receive solar rays 104 directly from the sun, and will also receive earth-shine rays 106. Since a satellite rotates as it revolves around the earth, while the earth is rotating and revolving around the sun, it is clear that the direction and intensity of the solar and earth-shine rays on a satellite's surface will vary in a continuous fashion. Clearly, if a satellite were located behind the earth, it would receive no solar radiation from the sun and little radiated energy from earth.

With the foregoing in mind, utilization of the testing facility will now be described. The solar simulator lamp 12 is turned on, and a diverging beam of simulated solar rays enter the chamber 10 through the quartz window 24 in the solar radiation receiving port 22. The simulated solar rays shine on the solar ray collimating mirror 34 which transmits the desired collimated beam of light to the satellite model 26. With the lamp 12 beaming rays at the satellite model while the satellite model is spinning in a desired mode, and with the earth-shine simulator lamp 14 on at appropriate low power, the satellite model 26 is subjected to the same solar radiation characteristics as would be an actual satellite in position 100 (FIG. 4).

To reproduce the radiation seen by the satellite S as it moves from position 100 to position 102, the earth-shine lamp is turned up, and the earth-shine collimating mirror is caused to rotate about the center axis of the testing chamber 10. A diverging beam of simulated earth-shine rays from lamp 14 enter the quartz window 24 in the earth-shine receiving port 20, are deflected to the earth-shine collimating mirror 32 by the transfer mirror 30, and are deflected to the satellite model 26 in a continuously moving fashion by the rotating collimating mirror 32.

The combination of the earth-shine beam sweeping through its arc relative to the solar beam, and the ability of the double gimbal-mounted satellite model to present any portion of its surface to the collimating mirrors 32 and 34, enables the facility to reproduce all possible radiation conditions of a satellite orbiting in space.

Eclipses caused by a satellite passing through the earth's shadow are simulated by simply shutting off the simulated radiation sources 12 and 14.

Since the solar and earth-shine simulator lamps 12 and 14 are located outside of the testing chamber 10, the heat dissipated by these lamps will not affect the temperature inside the chamber 10. Consequently, it is not generally necessary to have heat removing means within the chamber which would burden the refrigeration system thereof. Ideally, any test object inside the chamber should see nothing but the cold blackness of space and the two sources of radiation simulating sun and earth. In practice, it will "see" sources of heat at temperatures above 100° K., such as shroud penetrations for observation windows and instrumentation, internally-located TV cameras, and other internal, warm objects such as the back of mirror 34. The functioning of the test object itself will usually generate thermal energy. Furthermore, the light-energy transmission loss of even the best of mirrors (~5%) will result in heating up of the mirror, under certain conditions it may thus be necessary to provide some heat-removal means inside the chamber in addition to the shroud. The major heat load, however, is that of the solar and terrestrial simulator sources and their auxiliaries and these are located externally and not cooled by deep refrigeration. Air ventilation is usually sufficient for this purpose.

As can readily be seen by the foregoing description, this invention provides a testing facility which is capable of simulating all possible movements of, and the radiation seen by a satellite orbiting the earth.

Obviously many modifications and variations of the present invention are possible in the light of the above teachings. It is therefore to be understood, that within the scope of the appended claims, the invention may be practiced otherwise than as specifically described.

What is claimed is:
1. An improved outer space simulating facility, particularly adapted for studying the effects of direct and reflected solar radiation on an object orbiting the earth, comprising:
   a testing chamber having a solar ray receiving port and an earth-shine ray receiving port therethrough;
   a solar ray simulator lamp mounted outside said testing chamber adjacent said solar ray receiving port, and adapted to beam simulated solar rays through said solar ray receiving port;
   an earth-shine simulator lamp mounted outside said testing chamber adjacent said earth-shine ray receiving port and adapted to beam simulated earth-shine rays through said earth-shine receiving port;
   a model rotatably mounted in said testing chamber;
   a system of mirrors mounted in said testing chamber and adapted to receive the simulated solar and earth-shine rays beamed through said receiving ports, and direct them at said model;
   absorptive shroud means substantially surrounding said mirrors and said model, and means associated therewith capable of maintaining the temperature of said shroud at less than about 150° K.; and means communicating with the interior of said chamber capable of establishing and maintaining a high vacuum therein.

2. An outer space simulating facility as claimed in claim 1, wherein said system of mirrors comprises:
   an earth-shine ray receiving mirror;
   an earth-shine ray transfer mirror;
   an earth-shine ray collimating mirror; and
   a solar ray collimating mirror;
   said earth-shine ray receiving mirror being mounted adjacent said earth-shine ray receiving port and tilted to receive simulated earth-shine rays from said earth-shine simulator lamp and direct them to said earth-shine ray transfer mirror;
   said earth-shine ray transfer mirror being mounted between said earth-shine ray receiving mirror and said earth-shine ray collimating mirror, and tilted to receive simulated earth-shine rays from said earth-shine ray receiving mirror and direct them to said earth-shine ray collimating mirror;
   said earth-shine ray collimating mirror being mounted adjacent said model, and being tilted to receive simulated earth-shine rays from said earth-shine ray transfer mirror and direct them to said model; and
   said solar ray collimating mirror being mounted opposite said solar ray receiving port, and being tilted to receive simulated solar rays from said solar ray simulator lamp and direct them to said model.

3. An outer space simulating facility as claimed in claim 2, and additionallly comprising frame means adapted to rotate said earth-shine ray transfer mirror and said earth-shine ray collimating mirror substantially 180 degrees about the center axis of said testing chamber, whereby simulated radiation may be beamed at substantially the entire surface of said model.

4. An outer space simulating facility as claimed in claim 1, wherein said model is mounted in a double gimbal mounting.

5. An outer space simulating facility as claimed in claim 1, and additionally comprising fused silica windows seated in said solar ray and earth-shine receiving ports.

6. An outer space simulating facility for studying the effects of direct and reflected solar radiation on an object orbiting the earth, comprising:
   a testing chamber;
   a model rotatably mounted in said testing chamber;
   a plurality of mirrors mounted in said testing chamber;
   means external to said chamber for beaming simulated radiation at said mirrors;
   said mirrors being positioned to receive said simulated radiation and directed at said model from two directions, at least one of said mirrors being rotatable around a portion of said model.

7. The outer space simulating facility as claimed in claim 6 wherein said one of said mirrors directs light reflected therefrom only at said model.

8. An outer space simulating facility for studying the effects of direct and reflected solar radiation on an object orbiting the earth, comprising:
   a testing chamber;
   a model rotatably mounted in said testing chamber;
   a plurality of mirrors mounted in said testing chamber;
   means external to said chamber including a simulated solar ray source and a simulated earth-shine source for beaming simulated radiation on said mirrors;
   said mirrors being positioned to receive said simulated radiation and directed at said model, at least one of said mirrors being rotatable around a portion of said model.

9. The outer space simulating facility as claimed in claim 8, and additionally comprising at least two ports in said testing chamber, said solar ray and earth-shine sources being adapted to beam through said ports at certain of said mirrors.

References Cited

UNITED STATES PATENTS 1,758,825 5/1930 Darlington _____ 240—44.1
3,187,583 6/1965 Wilson et al. _____ 73—432

OTHER REFERENCES

Space Simulators, Circular, Tenney Eng. Inc., Union, N.J.

Goethert, High Altitude and Space Simulation Testing, A.R.S. Journal, June 1962, pp. 872, 879.

DAVID SCHONBERG, *Primary Examiner.*